United States Patent
Kang et al.

(10) Patent No.: US 7,099,109 B2
(45) Date of Patent: Aug. 29, 2006

(54) HARD DISK DRIVE HAVING AIR FLOW ACCELERATING DEVICE

(75) Inventors: Tae-sik Kang, Suwon-si (KR); Sang-hyub Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 74 days.

(21) Appl. No.: 10/391,812

(22) Filed: Mar. 20, 2003

(65) Prior Publication Data

US 2003/0179492 A1  Sep. 25, 2003

(30) Foreign Application Priority Data

Mar. 25, 2002  (KR) ............................. 2002-16087

(51) Int. Cl.
  *G11B 5/60* (2006.01)
(52) U.S. Cl. ................. 360/97.02; 360/99.12; 360/135
(58) Field of Classification Search .......... 360/97.01, 360/97.02, 97.03, 98.01, 98.08, 99.01, 99.12, 360/135
See application file for complete search history.

(56) References Cited

U.S. PATENT DOCUMENTS

| | | | | |
|---|---|---|---|---|
| 4,054,931 A | 10/1977 | Bolton et al. | .................. | 360/97 |
| 4,280,155 A | 7/1981 | Scott et al. | .................... | 360/98 |
| 4,385,333 A | 5/1983 | Hasler | .......................... | 360/97 |
| 4,553,183 A * | 11/1985 | Brown et al. | ............ | 360/97.02 |
| 4,724,499 A * | 2/1988 | Bratvold et al. | ......... | 360/98.01 |
| 5,909,339 A * | 6/1999 | Hong | ....................... | 360/98.07 |
| 5,923,496 A * | 7/1999 | Perona | ....................... | 360/96.1 |
| 5,999,370 A * | 12/1999 | Stone et al. | ............. | 360/256.1 |
| 6,181,519 B1 * | 1/2001 | Kim | ........................ | 360/236.6 |
| 6,335,843 B1 * | 1/2002 | Yotsuya et al. | .............. | 360/60 |
| 6,356,408 B1 | 3/2002 | Nii et al. | .................. | 360/98.07 |
| 6,628,470 B1 * | 9/2003 | Fujimori | .................. | 360/73.03 |

FOREIGN PATENT DOCUMENTS

| | | |
|---|---|---|
| JP | 51-121306 | 10/1976 |
| JP | 56-41558 | 4/1981 |
| JP | 61-117722 | 6/1986 |
| JP | 61-289585 | 12/1986 |
| JP | 63-056887 | 3/1988 |
| JP | 04-341982 | 11/1992 |
| JP | 08-339650 | 12/1996 |
| JP | 09-115235 | 5/1997 |
| JP | 2000-82274 | 3/2000 |

* cited by examiner

*Primary Examiner*—Jefferson Evans
(74) *Attorney, Agent, or Firm*—Staas & Halsey LLP

(57) ABSTRACT

A hard disk drive having an air flow accelerator for improving taking-off and landing of a slider on a surface of a disk. The hard disk drive includes a spindle motor and a disk for storing data which is rotated by the spindle motor. The slider includes a magnetic head for recording and reproducing data and is mounted on a pivotable actuator. The air flow accelerator is provided within an inner circumference of the disk and rotates together with the disk. The device may be formed integral with a disk clamp, the spindle motor, a disk spacer, the disk, or as a separate member. At least one blade extends in a radial direction from a center of rotation of the disk with the blade being curved in a direction opposite a rotation direction of the disk. The accelerated air flow restricts damage of the magnetic head and the disk.

31 Claims, 9 Drawing Sheets

US 7,099,109 B2

HARD DISK DRIVE HAVING AIR FLOW ACCELERATING DEVICE

CROSS-REFERENCE TO RELATED APPLICATIONS

This application claims the benefit of Korean Application No. 2002-16087 filed Mar. 25, 2002 in the Korean Intellectual Property Office, the disclosure of which is incorporated herein by reference.

BACKGROUND OF THE INVENTION

1. Field of the Invention

The present invention relates to a hard disk drive, and more particularly, to a hard disk drive having an air flow accelerating device to improve a feature of taking-off and landing of a slider where a magnetic head is mounted.

2. Description of the Related Art

A hard disk drive is one of auxiliary memory devices of a computer, to read out data stored in a magnetic disk or record data on the magnetic disk by using a magnetic head.

FIG. 1 is a plan view illustrating a conventional hard disk drive. FIG. 2 is an enlarged perspective view illustrating a landing zone of the disk shown in FIG. 1.

Referring to FIGS. 1 and 2, a conventional hard disk drive includes a magnetic disk 20 that is a recording medium for recording data, a spindle motor 30 installed on a base plate 10 for rotating the disk 20, and an actuator 40 having a magnetic head 41 for recording and reproducing data with respect to the disk 20.

The disk 20 is typically provided as one or a plurality of disks separated a predetermined distance from each other and installed to be rotated by the spindle motor 30. A landing zone 21 where a slider 42 having the magnetic head 41 mounted thereon is accommodated when power is turned off is provided within an inner circumference of the disk 20. A data zone 22 where a magnetic signal is recorded is provided outside the landing zone 21.

The actuator 40 is pivotable around a pivot shaft 47 installed on the base plate 10 by a voice coil motor 48. The actuator 40 includes an arm 46 pivotably coupled around the pivot shaft 47. The magnetic head 41 is integral with the slider 42 and a suspension 44 is installed at the arm 46 for supporting and elastically biasing the slider 42 toward a surface of the disk 20.

In the conventional hard disk drive having a structure as described above, during recording/reproducing of data, lift generated by rotation of the disk 20 and an elastic force provided by the suspension 44 act on the slider 42 having the magnetic head 41. Accordingly, the slider 42 maintains a lifted state above the data zone 22 of the disk 20 at a height where the lift and the elastic force are balanced and the magnetic head 41 records and/or reproduces data to/from the disk 20. When power is turned off and the disk 20 stops rotating, since the lift acting on the slider 42 disappears, the slider 42 should be out of the data zone 22 of the disk 20 in advance of the loss of lift to prevent damage of the data zone 22 as the slider 42 contacts the data zone 22. That is, if the arm 46 of the actuator 40 pivots to be moved above the landing zone 21 before the rotation of the disk 20 completely stops, damage to the data zone 22 when the disk stops rotating completely is preventable.

When the power is turned on and the disk 20 begins to rotate, the lift is generated so that the slider 42 is lifted. The lifted slider 42 is moved to the data zone 22 of the disk 20 as the arm 46 pivots so that the magnetic head 41 performs recording and/or reproduction of data on/from the data zone 22 of the disk 20. To facilitate lift of the slider 42 by reducing a contact area between the slider 42 and the landing zone 21 of the disk 20, a plurality of bumps 21a, each having a crater shape, may be formed on the landing zone 21 by a laser, as shown in FIG. 2.

FIGS. 3A through 3C show a sequence of lifting the slider 42 having the magnetic head 41 mounted thereon by the rotation of the disk.

Referring to FIG. 3A, the slider 42 rests on the bumps 21a formed on the surface of the disk 20 before the disk 20 rotates. When the power is supplied to the hard disk drive and the disk 20 is rotated, the slider 42 is gradually lifted by receiving the lift generated by the rotation of the disk 20 so that the contact area with the bumps 21a decreases, as shown in FIG. 3B. Since a side of the slider 42 to which air is supplied by the rotation of the disk 20 is lifted first, the slider 42 is initially slightly inclined at a small angle. When the rotation speed of the disk 20 reaches a regular rotation speed after a few seconds, the slider 42 is completely lifted to maintain a predetermined distance from the surface of the disk 20, as shown in FIG. 3C. In the completely lifted state, the slider 42 is moved to the data zone 22 of the disk 20 as the arm 46 shown in FIG. 1 pivots. However, when the power of the hard disk drive is turned off, the rotation of the disk 20 is stopped and the slider 42 will be urged toward the disk 20 by an elastic force B of the suspension 44.

In a contact start stop type magnetic head loading/unloading system, when the disk 20 rotates again after being stopped, the slider 42 is abraded by the surface of the rotating disk 20 until the slider 42 is completed lifted by the lift generated by the rotation of the disk 20.

The abrading problem also occurs when the disk 20 stops rotating and the slider 42 is accommodated in the landing zone 21 of the disk 20. That is, as the rotation speed of the disk 20 is gradually reduced, the lift lifting the slider 42 decreases. Thus, the slider 42 is lowered and contacts the surface of the disk 20. The slider 42 is abraded by the surface of the disk 20 for a long time so that the magnetic head 41 mounted on the slider 42 may be damaged, thus deteriorating reliability of the hard disk drive. Also, particles are generated due to the abrasion. If a lift height of the slider 42 is gradually reduced, a distance between the bumps 21a and the slider 42 gradually decreases and the above problems become more serious.

SUMMARY OF THE INVENTION

To solve the above-described problems, it is an aspect of the present invention to provide a hard disk drive having an air flow accelerating device which accelerates a speed of air flowing between a slider and a surface of a disk to improve a feature of taking-off and landing of the slider where a magnetic head is mounted.

Additional aspects and advantages of the invention will be set forth in part in the description which follows, and, in part, will be obvious from the description, or may be learned by practice of the invention.

To achieve the above and/or other aspects of the present invention, there is provided a hard disk drive comprising a spindle motor installed in a housing having a predetermined inner space, at least one disk for storing data which is installed at the spindle motor by a disk clamp, a pivotable actuator installed in the housing and having a slider where a magnetic head for recording and reproducing data is mounted, and an air flow accelerating device, provided within an area corresponding to an inner circumference of the disk, rotatable with the disk, and having at least one blade for accelerating a speed of air flowing between the slider and a surface of the disk during the rotation of the disk.

The airflow accelerating device may comprise a ring member inserted around a periphery of a disk accommodating portion of the spindle motor, wherein the blade extends from the ring member in a radial direction and is curved in an opposite direction to a direction in which the disk rotates.

At least three blades may be arranged at equally spaced intervals along a circumference of the ring member. A thickness of each blade may be in a range including 0.1 and 0.3 mm. A front surface of the blade colliding with air according to the rotation of the air flow accelerating device may be inclined to form an acute angle with the surface of the disk.

A plurality of disks may be installed at the hard disk drive, and a respective airflow accelerating device may be provided corresponding to each recording surface of each of the disks. A spacer may be installed to maintain space between the disks, and the respective air flow accelerating device may be installed between the disk clamp and the disk adjacent to the disk clamp, between each spacer and the disks adjacent to the spacer, and between a disk accommodation portion of the spindle motor and the disk adjacent to the spindle motor.

An outer circumference of the blade may be greater than an outer diameter of an associated one of each of the disk clamps, the spacer, and the disk accommodation portion of the spindle motor.

The air flow accelerating device may be installed between the spacer and the disk and integrally formed with each surface of the spacer which is adjacent to one of the disks. Alternatively, the air flow accelerating device may be formed integral with the surface of the disk.

Thus, a feature of taking-off and landing of the slider is improved, and damage and abrasion of the magnetic head and the disk are restricted.

BRIEF DESCRIPTION OF THE DRAWINGS

The above and/or other aspects and advantages of the present invention will become more apparent by describing in detail embodiments thereof with reference to the attached drawings in which.

DESCRIPTION OF THE PREFERRED EMBODIMENTS

Figure 1:
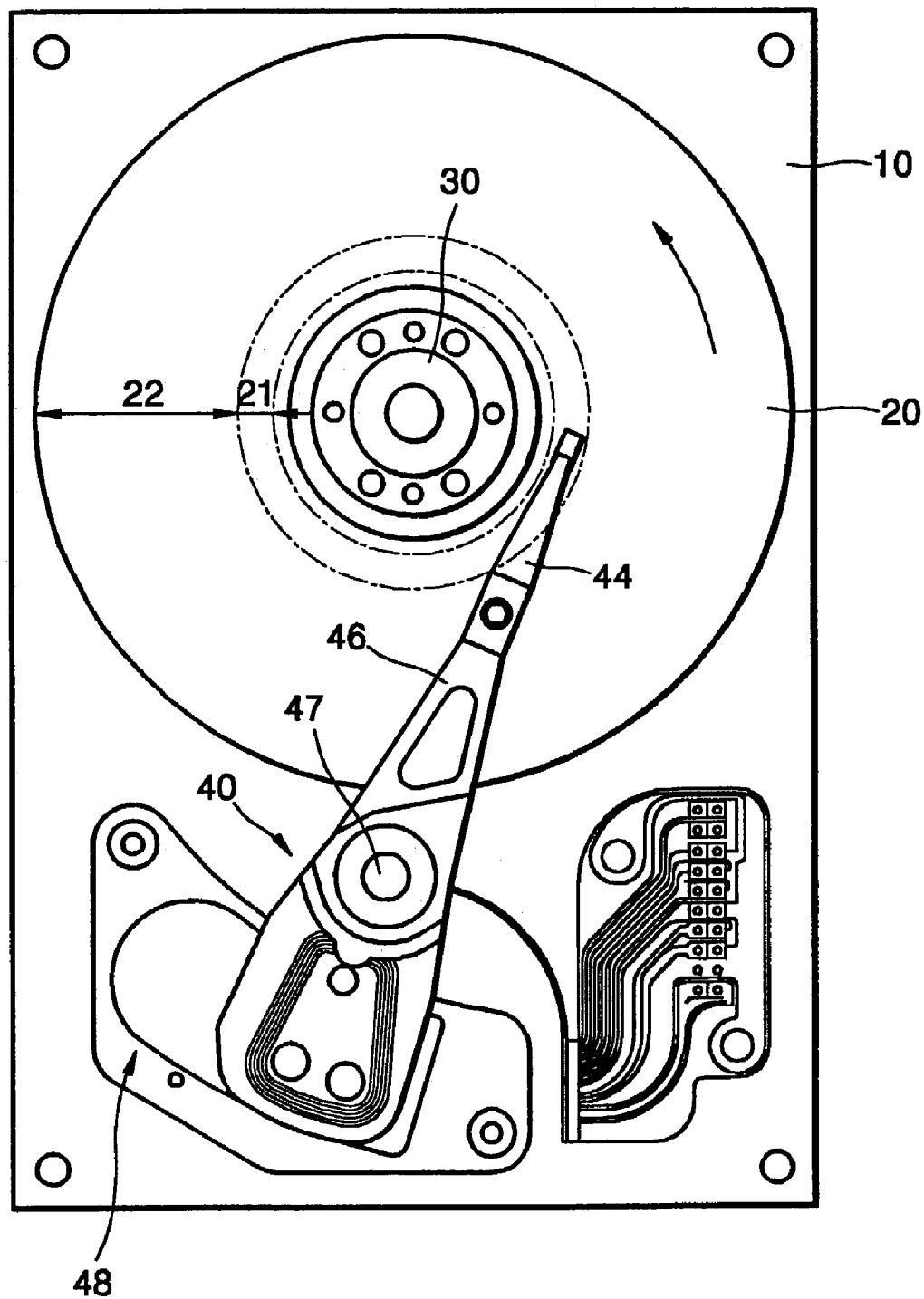
FIG. 1 is a plan view illustrating a conventional hard disk drive.
Figure 2:
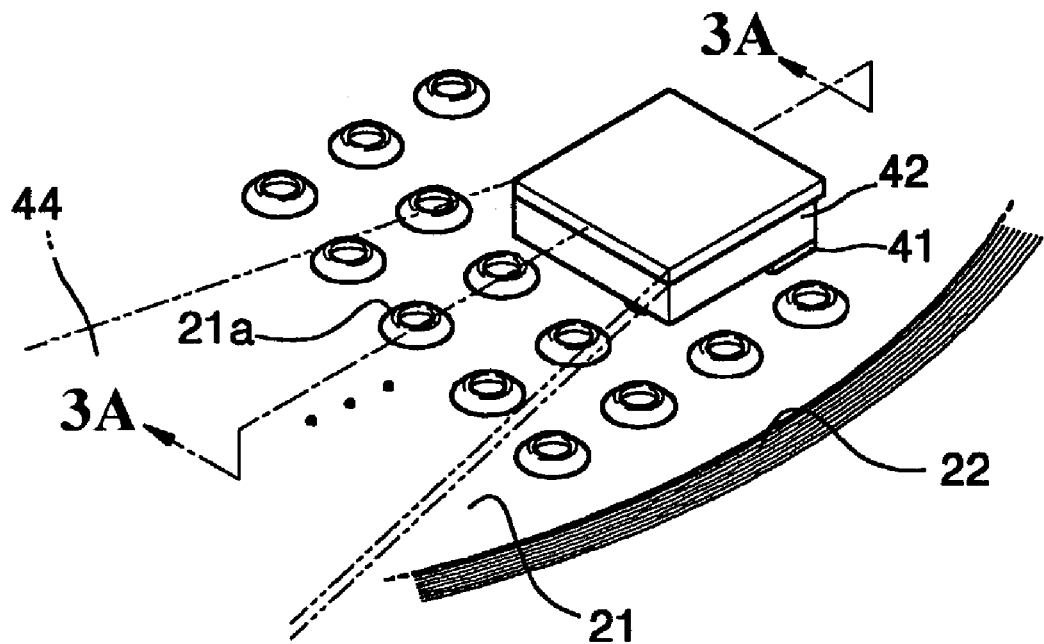
FIG. 2 is an enlarged perspective view illustrating a landing zone portion of the disk of FIG. 1.
Figure 3A:
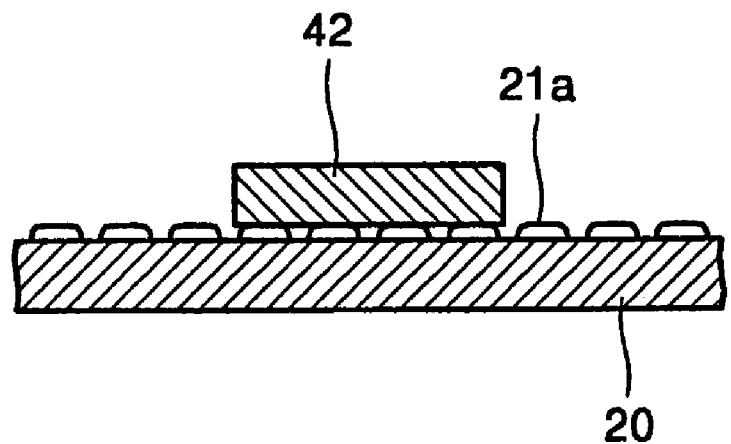
FIG. 3A is a sectional view taken along a line 3A—3A shown in FIG. 2 and illustrating the slider of FIG. 2 at rest on the disk.
Figure 3B:
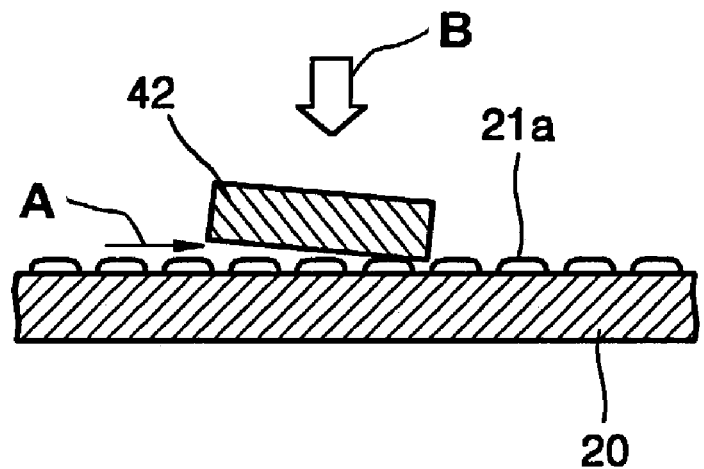
FIG. 3B is another sectional view taken along the line 3A—3A shown in FIG. 2 and illustrating an initial lifting of the slider.
Figure 3C:
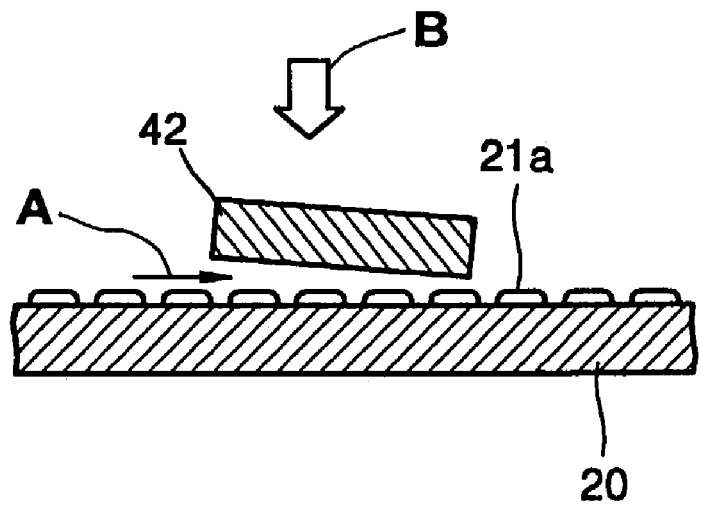
FIG. 3C is yet another sectional view taken along the line 3A—3A shown in FIG. 2 and illustrating the slider fully lifted slider.

Reference will now be made in detail to the present embodiments of the present invention, examples of which are illustrated in the accompanying drawings, wherein like reference numerals refer to like elements throughout.

Referring to FIGS. 4 through 7, a hard disk drive according to the present invention includes a housing having a predetermined inner space. A spindle motor 130, one or a plurality of magnetic disks 120, and an actuator 140 are installed in the housing.

The housing is installed in a main body of a computer and formed of a base plate 111 which supports the spindle motor 130 and the actuator 140, and a cover plate 112 coupled to the base plate and which supports and protects the disk 120. The housing may be formed of stainless steel or aluminum material.

The disk 120 is provided as a single disk or as a plurality of disks which are separated a predetermined distance from each other, and rotatable by the spindle motor 130. A landing zone 121, where data is not recorded and where a slider 142 having a magnetic head 141 mounted thereon is accommodated when power is turned off, is provided at an inner circumferential surface of the disk 120. A data zone 122 where data is recorded is provided at an outer circumferential surface of the disk 120.

The spindle motor 130 which rotates the disk 120 is fixedly installed on the base plate 111. A disk clamp 160 which fixes the disk 120 to the spindle motor 130 is coupled to the upper end portion of the spindle motor 130. When a plurality of the disks 120 are installed at the spindle motor 130, a ring-shaped spacer 150 which maintains an interval between the disks 120 is inserted between the disks 120.

The actuator 140 for recording or reproducing data on or from the disk 120 is installed on the base plate 111. The actuator 140 comprises an arm 146 coupled to and pivotable around the pivot shaft 147, a voice coil motor 148 which drives the arm 146, and a suspension 144 which supports the slider 142 having the magnetic head 141 and elastically biases the slider 142 toward the surface of the disk 120.

An air flow accelerating device 170 that rotates together with the disk 120 is installed at an inner side of the landing zone 121 of the disk 120. The air flow accelerating device 170 accelerates a speed of air flowing between the slider 142 and the surface of the disk 120 during the rotating of the disk 120. The air flow accelerating device 170 comprises a ring member 172 inserted around the periphery of the spindle motor 130 and at least one blade 174 extending in a radial direction from the ring member 172 and bending or curving in a direction opposite to a direction in which the disk 120 rotates. The airflow accelerating device 170 may be provided with the one blade 174 or alternatively may be provided with a plurality of the blades 174, up to tens of blades. In the embodiments shown herein, three blades 174 are arranged equally spaced along the circumference of the ring member 172, as shown in FIG. 5.

Figure 5:
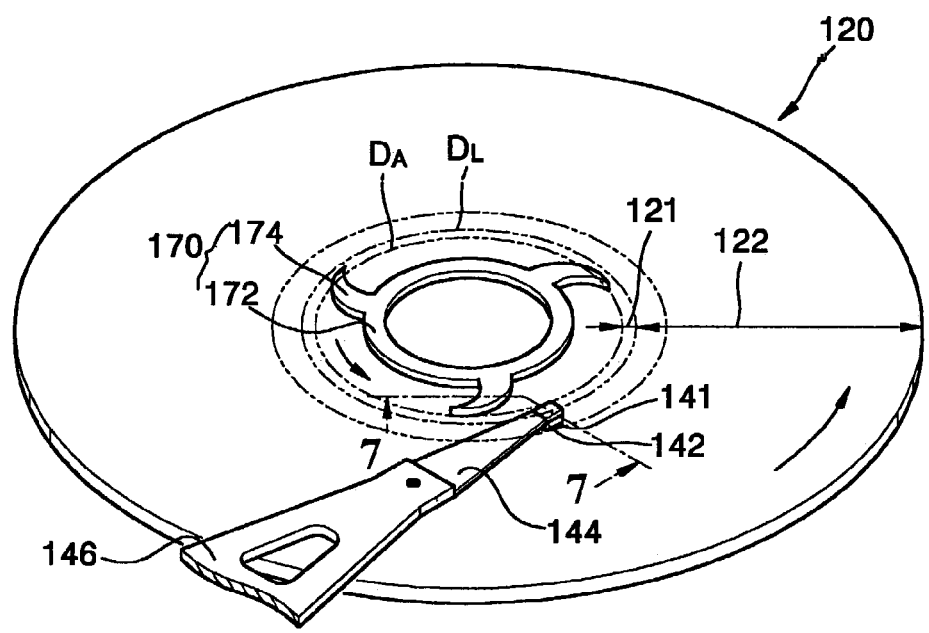
FIG. 5 is an enlarged perspective view illustrating the air flow accelerating device of FIG. 4 and an associated disk.
Figure 6:
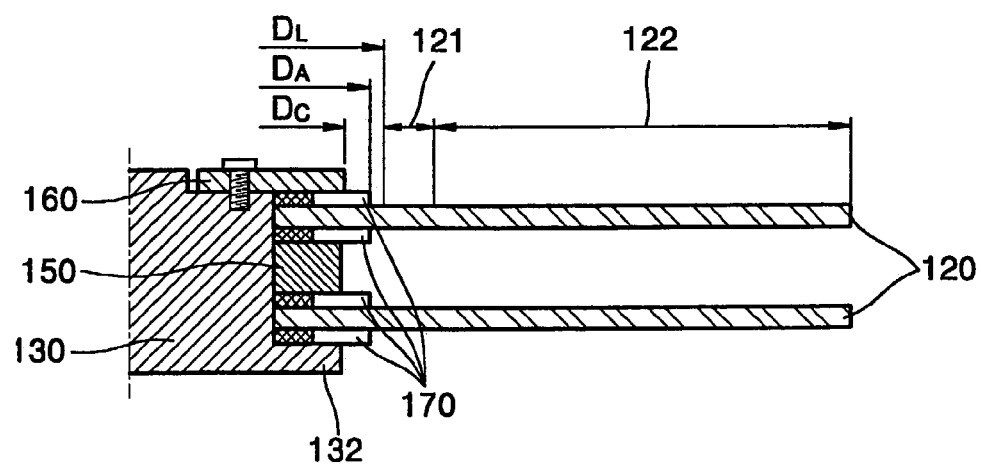
FIG. 6 is a vertical sectional view illustrating a plurality of disks and the corresponding air flow accelerating devices coupled to the spindle motor.

As shown in FIGS. 5 and 6, each blade 174 extends to an outer diameter $D_A$ smaller than an inner diameter $D_L$ of the landing zone 121 of the disk 120. Being within the smaller diameter $D_A$ prevents the slider 142 from colliding with the blade 174 when the slider 142 is accommodated in the landing zone 120. Also, the outer diameter $D_A$ to which the blade 174 extends is preferably greater than an outer diameter of each of the disk clamp 160, the spacer 150, and a disk accommodation portion 132 of the spindle motor 130. A blade extension to the greater outer diameter of $D_A$ permits air to smoothly flow between the disk clamp 160 and the disk 120. Consequently, the outer diameter $D_A$ to which the blade 174 extends is preferably set to be within a range as large as possible without the blade 174 colliding with the slider 142.

Figure 7:
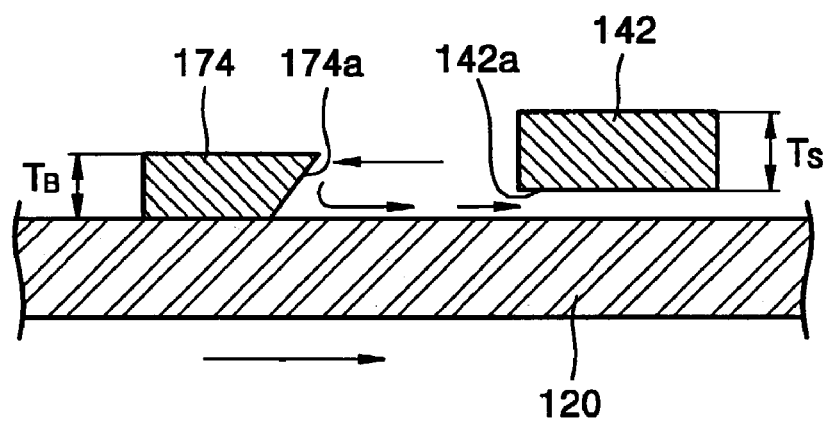
FIG. 7 is a sectional view taken along line 7—7 of FIG. 5, and illustrating a blade and a lifting effect on the slider.

As shown in FIG. 7, a thickness $T_B$ of the blade 174 is preferably not greater than a thickness $T_S$ of the slider 142. For example, since the thickness $T_S$ of the slider 142 is about 0.3 mm, the thickness $T_B$ of the blade 174 is preferably in a range including 0.1 mm and 0.3 mm. This range of the thickness $T_B$ prevents air colliding with a front surface 174a of the blade 174 from being exhausted above the slider 142. A flow of air above the slider 142 tends to prevent lifting of the slider 142.

The front surface 174a of the blade 174, with which air collides as the blade 174 rotates, may form an acute angle with the surface of the disk 120. The acute angle guides the air colliding with the front surface 174a of the blade 174 and being exhausted to the outside to flow close to the surface of the disk 120 and not above the slider 142. Thus, since most of the air flow generated by the blade 174 flows between the surface of the disk 120 and the bottom surface of the slider 142, that is, an air bearing surface 142a, lift for lifting the slider 142 is greatly generated. When the front surface 174a of the blade 174 is inclined, since the air generated by the blade 174 flows toward the bottom surface of the slider 142, the thickness $T_B$ of the blade 174 does not need to be smaller than the thickness $T_S$ of the slider 142.

Figure 4:
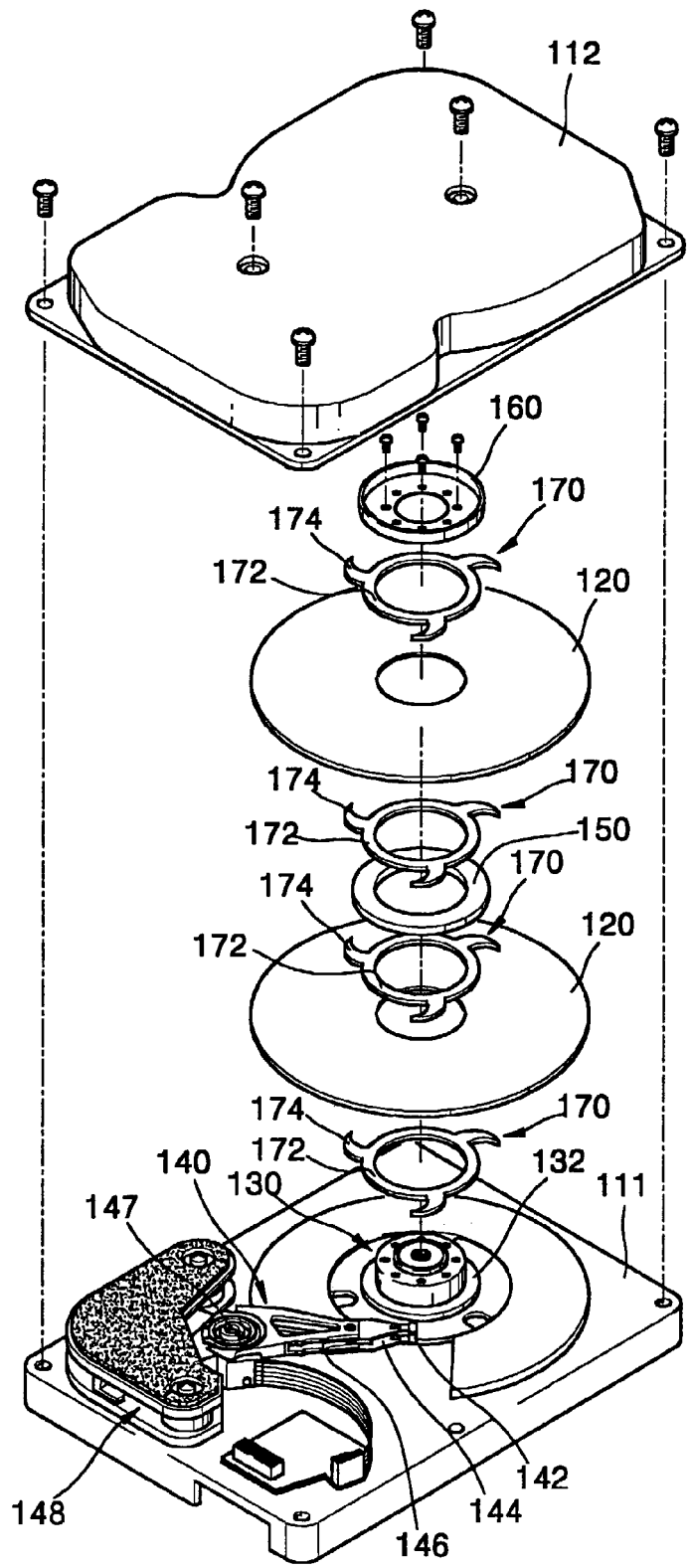
FIG. 4 is an exploded perspective view illustrating a hard disk drive having an air flow accelerating device according to the present invention.

As shown in FIGS. 4 and 6, when a plurality of the disks 120 are installed in the hard disk drive, an air flow accelerating device 170 is provided corresponding to each recording surface of the disks 120. In particular, if two disks 120 are installed and both of the disks are two sided disks, a total of four air flow accelerating devices 170, each at one side of each disk 120, are installed. That is, a first air flow accelerating device 170 is installed between the first disk 120 and the disk clamp 160, the second air flow accelerating device 170 is installed between the first disk 120 and the upper surface of the spacer 150, the third air flow accelerating device is installed between the lower surface of the spacer 150 and the second disk 120, and the fourth air flow accelerating device is installed between the lower surface of the second disk 120 and the disk accommodation portion 132 of the spindle motor 130. When a single disk is installed, although not shown, the air flow accelerating device 170 may be installed at each of both sides of the disk 120. In the case of using only one side of the disk as a recording surface, the air flow accelerating device 170 may be installed at the one side thereof only.

Figure 14:
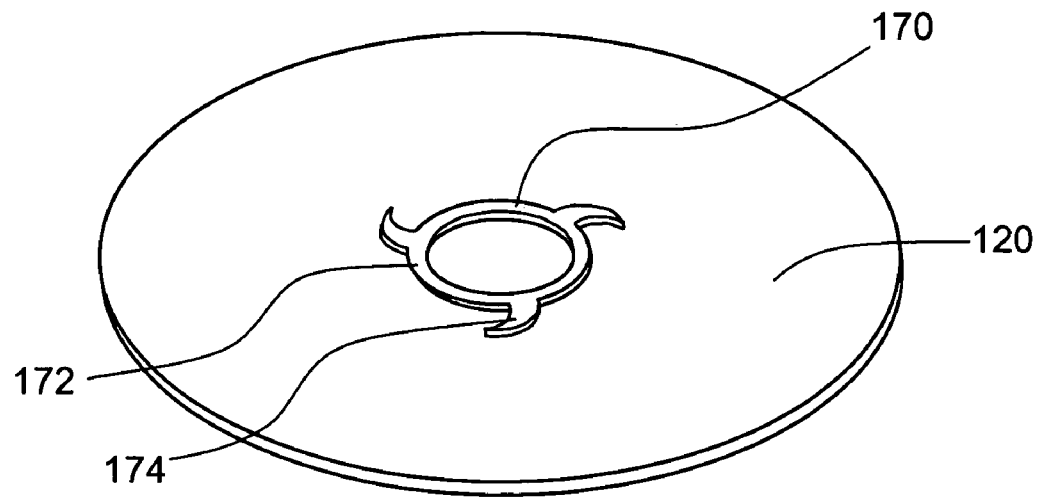
FIG. 14 is a view illustrating forming the air accelerating device integral with the disk.

In the above description, the air flow accelerating device 170 is installed as an additional member separate from the disk 120 and the spacer 150. However, the air flow accelerating device 170 may be formed integrally with one side surface or both side surfaces of the disk 120, as shown in FIG. 14. In this case, since the airflow accelerating device 170 may be formed together with the disk when the disk 120 is manufactured, manufacturing of the air flow accelerating device is simplified and a cost thereof is reduced. For example, the air flow accelerating device 170 may be formed by sputtering or depositing a predetermined substance on the surface of the disk 120. Also, the air flow accelerating device 170 may be formed by forming a predetermined substance layer on the surface at the inner circumference of the disk 120 and then etching the substance layer to fit to the shapes of the ring member 172 and the blade 174.

Figure 8:
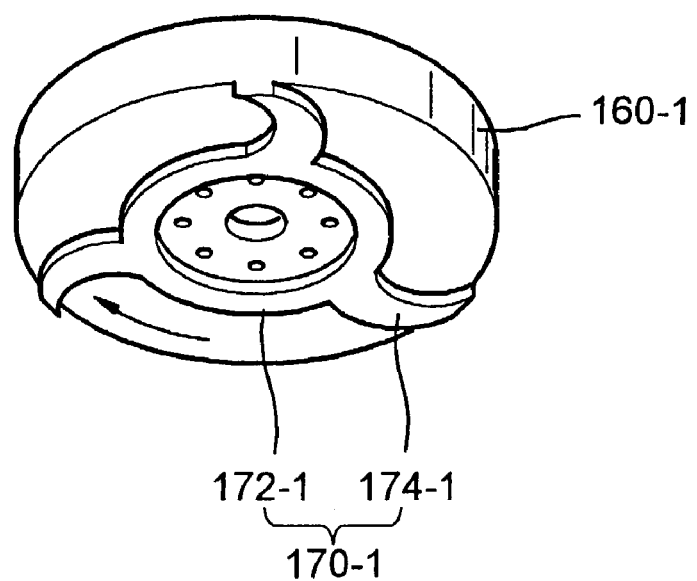
FIG. 8 is a perspective view illustrating the air flow accelerating device integrally formed with the disk clamp.
Figure 9:
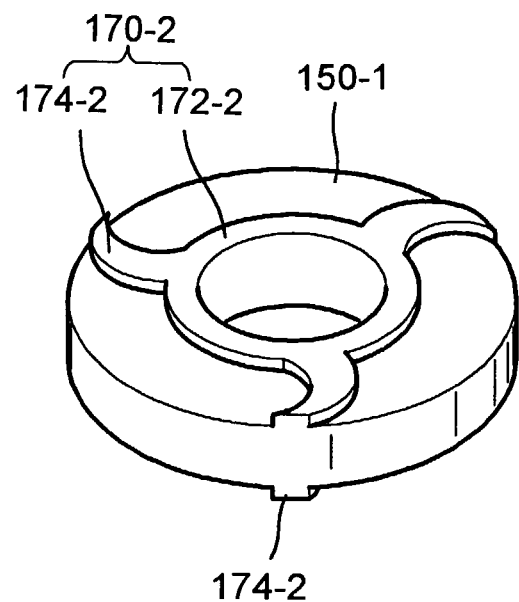
FIG. 9 is a perspective view illustrating the air flow accelerating device integrally formed with a spacer.

Also, as shown in FIG. 8, an air flow accelerating device 170-1 may be formed integrally with a bottom surface of a disk clamp 160-1. In this case, the bottom surface of the disk clamp 160-1 is manufactured to form a ring member 172-1 and a blade 174-1. As shown in FIG. 9, an air flow accelerating device 170-2 may be formed integrally with each of upper and lower surfaces of a spacer 150-1. In this case, the upper and lower surfaces of the spacer 150-1 are manufactured to form a ring member 172-2 and a blade 174-2.

The operation of the air flow accelerating device having the above structure according to the present invention will now be described with reference to FIGS. 10 through 13.

Figure 10:
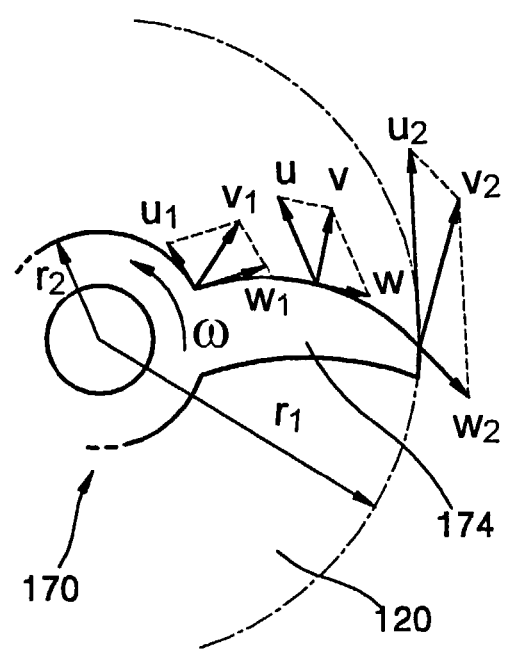
FIG. 10 is a view for explaining the direction and speed of the flow of air formed at a leading edge of the blade of the air flow accelerating device.
Figure 11:
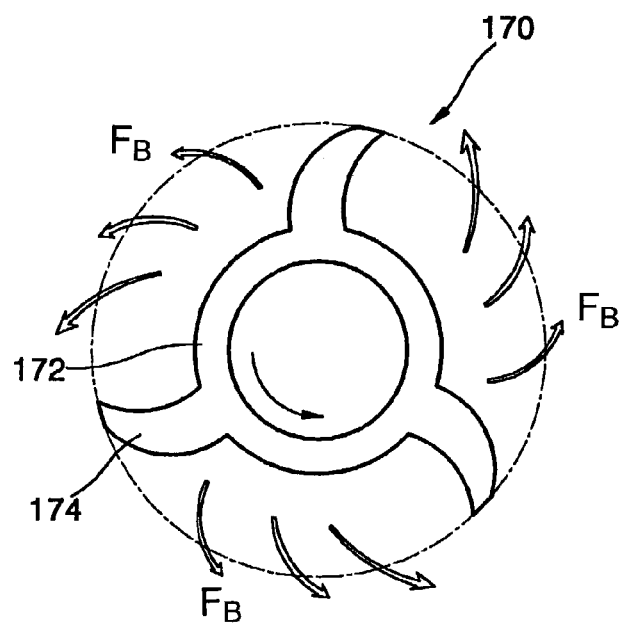
FIG. 11 is a view illustrating directions of the flow of air exhausted by the air flow accelerating device.
Figure 12:
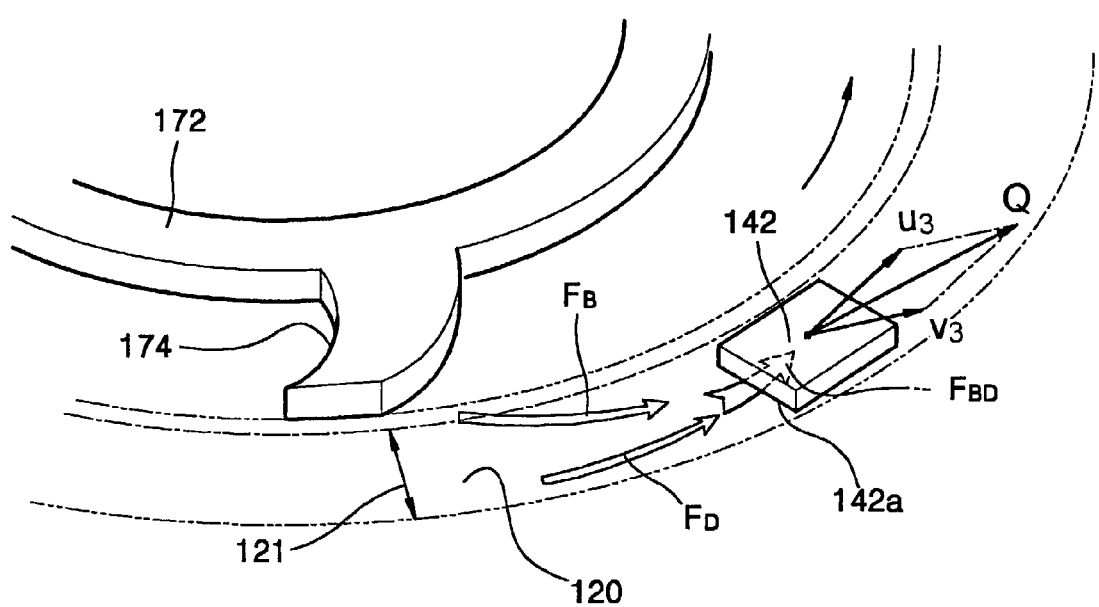
FIG. 12 is a view for explaining the effects of the flow of the air generated by the air flow accelerating device and the flow of the air generated by the rotation of the disk to the speed of lifting of the slider.

FIG. 10 is a view for explaining a direction and speed of the flow of airformed in front of the blade of the air flow accelerating device. FIG. 11 is a view illustrating the direction of the flow of air exhausted by the air flow accelerating device. FIG. 12 is a view for explaining the effects of the flow of the air generated by the air flow accelerating device and the flow of the air generated by the rotation of the disk to the speed of lifting of the slider, and FIG. 13 is a graph indicating a relationship of airflow generated by the accelerating device and airflow generated by the rotation of the disk to the speed of lifting of the slider.

Referring to FIG. 10, when the power of the hard disk drive is supplied and the disk 120 begins to rotate, the blade 174 of the air flow accelerating device 170 is rotated counterclockwise together with the disk 120. Here, the air in front of the blade 174 has a velocity component u proportional to a linear velocity $r\omega$ of the disk 120 and a velocity component w directed outward according to a front surface of the blade 174 that is curved, where r is in a range including $r_1$ and $r_2$. Thus, the flow of the airformed by the blade 174 has a velocity v obtained by synthesizing the above two components. Here, in the velocity component u proportional to the linear velocity $r\omega$ of the disk 120, a velocity component $u_2$ at the outer end portion of the blade 174 is greater than a velocity component $u_1$ at the inner end portion thereof. Accordingly, in the flow of the air formed by the blade 174, a velocity $v_2$ at the outer end portion is greater than a velocity $v_1$ at the inner end portion, so that the direction of the airflow is changed to a direction in which the disk 120 rotates.

As a result, as shown by a plurality of arrows $F_B$ in FIG. 11, the flow of the air formed by the blade 174 of the air flow accelerating device 170 directs the outside of the air flow accelerating device 170 and is bent to the direction in which the disk 120 rotates.

Figure 13:
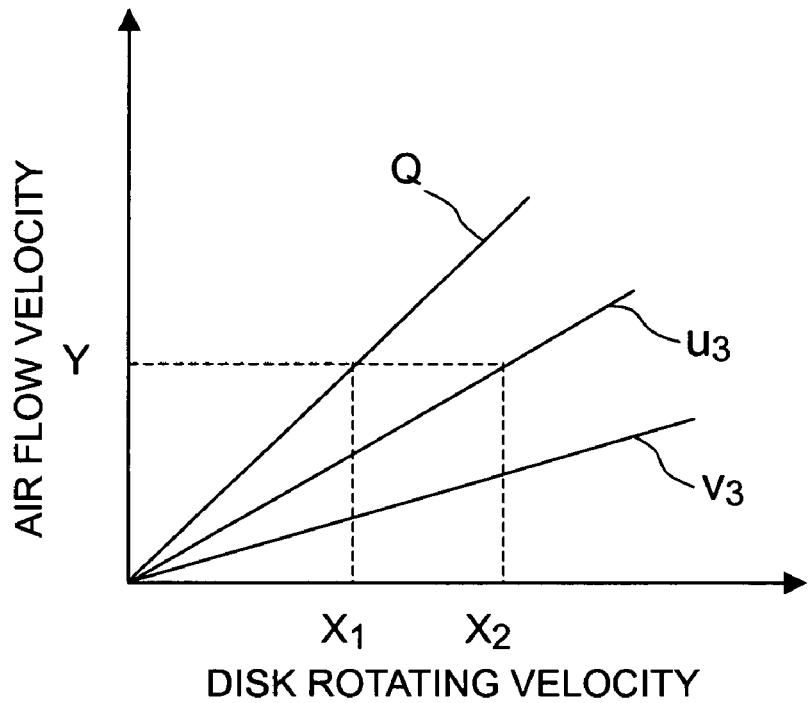
FIG. 13 is a graph indicating a relationship of air flow generated by the accelerating device and air flow generated by the rotation of the disk to the speed of lifting of the slider.

Referring now to FIGS. 12 and 13, the flow $F_B$ of the air formed at the blade 174 flows in the landing zone 121 of the disk 120 provided radially outward of the blade 174. Here, the air meets the flow $F_D$ of the air formed by the rotation of the disk 120 and having a velocity $u_3$ proportional to the linear velocity of the disk 120. The two air flows $F_B$ and $F_D$ are directed between the air bearing surface 142a of the slider 142 and the surface of the disk 120. Thus, an air flow $F_{BD}$ under the air bearing surface 142a of the slider 142 may be explained by vector synthesizing the two air flows $F_B$ and $F_D$. The air flow $F_{BD}$ has a higher synthesized velocity Q by vector-synthesizing the velocity $u_3$ of the air flow $F_D$ formed by the rotation of the disk 120 and the velocity $v_3$ of the air flow $F_B$ formed by the blade 174. Thus, the air flows $F_B$ and $F_D$ combine to form the air flow $F_{BD}$ according to respective vector components of $F_B$ and $F_D$.

As described above, when the velocity Q of the air flow $F_{BD}$ flowing under the air bearing surface 142a of the slider 142 increases, the lift lifting the slider 142 increases proportionally so that the slider 142 can more quickly lifted at a low rotation speed of the disk 120. That is, referring to FIG. 13, assuming that a speed of air flow for lifting the slider 142 is Y, when only the air flow $F_D$ formed by the rotation of the disk 120 exists, the rotational speed of the disk 120 should reach X2 for the velocity $u_3$ of the airflow $F_D$ to reach Y. In contrast, when the air flow $F_{BD}$ of the synthesis of the two air flows $F_B$ and $F_D$ according to the present invention exists, if the rotational speed of the disk 120 reaches X1 lower than X2, the synthesized velocity Q reaches the air flow velocity Y which can lift the slider 142. Thus, according to the present invention, the slider 142 is lifted at a relatively lower disk rotation speed, which means that the slider 142 is lifted considerably faster than that of the conventional disk drive. Additionally, when the slider 142 is accommodated in the landing zone 121 of the disk 120, the slider 142 will maintain in a lifted state for a longer time as the rotational speed of the disk 120 is lowered compared to a lift time of the conventional disk drive with a slowing disk rotational speed.

As a result, when the power is supplied to the hard disk drive of the present invention, the disk 120 begins to rotate and the slider 142 accommodated in the landing zone 121 of the disk 120 is lifted faster compared to the conventional disk dive. When the power is turned off, the rotational speed of the disk 120 is reduced, the slider 142 stably lands on the landing zone 121. Accordingly, since a time of friction between the surface of the disk 120 and the slider 142 is reduced, damage to the disk 120 and the magnetic head 141 due to long time friction between the disk 120 and the slider 142 is prevented and a durability of the slider and a durability of the disk are improved.

Also, possibility of generation of particles due to abrasion of the disk 120 and the slider 142 is reduced. Fine particles existing on the disk 120 are reduced by a strong air flow formed by the air flow accelerating device.

As described above, according to the hard disk drive according to the present invention, the lift speed of the slider becomes fast by the air flow accelerating device and landing of the slider is stabilized. Accordingly, damage to the disk and magnetic head due to long time friction between the disk and the slider is reduced so that durability is improved. Also, the possibility of generation of particles due to abrasion of the disk and the slider is reduced. Furthermore, since fine particles existing on the disk are removed by a strong air flow, a disk cleaning effect can be obtained.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A hard disk drive comprising:
   a housing;
   a spindle motor installed in the housing;
   at least one disk which stores data;
   a disk clamp which engages the disk with the spindle motor;
   a pivotable actuator installed in the housing;
   a slider mounted to the pivotable actuator and having a magnetic head for recording/reproducing data to/from the disk; and
   an air flow accelerating device provided at an inner circumferential side of the disk to be rotated together with the disk, and having at least one blade which accelerates a speed of the flow of air flowing between the slider and a surface of the disk during the rotation of the disk,
   wherein the air flow accelerating device is integrally formed with a surface of the disk.

2. The hard disk drive as claimed in claim 1, wherein a front surface of the blade colliding with air according to the rotation of the air flow accelerating device is inclined to form an acute angle with the surface of the disk.

3. The hard disk drive as claimed in claim 1, wherein an outer extension of the blade is within a diameter which is smaller than a diameter of a landing zone for the slider provided on the disk surface.

4. The hard disk drive as claimed in claim 1, wherein:
   the spindle motor further comprises a disk accommodation portion;
   the air flow accelerating device is installed between the disk and the disk clamp, and
   the hard disk drive further comprises another air flow accelerating device installed between the disk and the disk accommodation portion of the spindle motor.

5. The hard disk drive as claimed in claim 4, wherein outer diameters of the blade of the air flow accelerating device and the blade of the another air flow accelerating device, are greater than outer diameters of the disk clamp and the disk accommodation portion of the spindle motor, respectively.

6. The hard disk drive as claimed in claim 1, wherein the air flow accelerating device is integrally formed with a surface of the disk clamp adjacent to the disk.

7. The hard disk drive as claimed in claim 1, wherein a plurality of disks and a plurality of air flow accelerating devices are installed in the hard disk drive, and a respective one of the plurality of air flow accelerating devices is provided corresponding to each recording surface of each of the disks.

8. The hard disk drive as claimed in claim 7, wherein:
   the spindle motor further comprises a disk accommodation portion; and
   the disk drive further comprises a spacer which maintains an interval between a pair of the disks, and one of the plurality of air flow accelerating devices is installed between one of the plurality of disks and each of the disk clamp and the spacer, and another of the plurality of air flow accelerating devices is installed between another of the plurality of disks and the disk accommodation portion of the spindle motor.

9. The hard disk drive as claimed in claim 8, wherein an outer circumference of the blade of a respective one of the air flow accelerating devices is greater than an outer diameter of a corresponding one of the disk clamp, the spacer, and the disk accommodation portion of the spindle motor.

10. The hard disk drive as claimed in claim 7, further comprising a spacer which maintains an interval between the disks, and respective air flow accelerating devices are integrally formed with each surface of the spacer adjacent a respective one of the disks.

11. A hard disk drive comprising:
a housing;
a spindle motor installed in the housing;
at least one disk which stores data;
a disk clamp which engages the disk with the spindle motor;
a pivotable actuator installed in the housing;
a slider mounted to the pivotable actuator and having a magnetic head for recording/reproducing data to/from the disk; and
an air flow accelerating device provided at an inner circumferential side of the disk to be rotated together with the disk, and having at least one blade which accelerates a speed of the flow of air flowing between the slider and a surface of the disk during the rotation of the disk,
wherein the air flow accelerating device comprises a ring member inserted around the spindle motor, and
wherein the blade extends from the ring member in a radial direction and is curved in an opposite direction to a direction in which the disk rotates.

12. The hard disk drive as claimed in claim 11, wherein at least three blades are arranged at equally spaced intervals along a circumference of the ring member.

13. A hard disk drive comprising:
a housing;
a spindle motor installed in the housing;
at least one disk which stores data;
a disk clamp which engages the disk with the spindle motor;
a pivotable actuator installed in the housing;
a slider mounted to the pivotable actuator and having a magnetic head for recording/reproducing data to/from the disk; and
an air flow accelerating device provided at an inner circumferential side of the disk to be rotated together with the disk, and having at least one blade which accelerates a speed of the flow of air flowing between the slider and a surface of the disk during the rotation of the disk,
wherein a thickness of the blade is not greater than a thickness of the slider.

14. The hard disk drive as claimed in claim 13, wherein the thickness of the blade is in a range including 0.1 and 0.3 mm.

15. A hard disk drive, comprising:
a disk which stores data and having a surface with first, second and third areas;
a spindle motor which rotates the disk;
a slider having a magnetic head recording and/or reproducing data on the first area of the disk;
a pivotable actuator which moves the slider through the first area to record and/or reproduce the data and which moves the slider to a resting position in the second area; and
an air mover which is positioned within the third area and which rotates with the disk to direct air between the slider and the disk, to lift the slider from the surface of the disk during rotation of the disk,
wherein the air mover moves the air with a first vectored component in a radially outward direction and a second vectored component in a direction which is additive to a third vectored component resulting from rotation of the disk relative to the slider.

16. The hard disk drive as claimed in claim 15, wherein the air mover comprises at least one blade arranged within the third area.

17. The hard disk drive as claimed in claim 16, wherein at least three of the blades are arranged at equally spaced intervals within the third area.

18. The hard disk drive as claimed in claim 16, wherein a thickness of the blade is not greater than a thickness of the slider.

19. The hard disk drive as claimed in claim 16, wherein the thickness of the blade is in a range including 0.1 and 0.3 mm.

20. The hard disk drive as claimed in claim 16, wherein a front surface of the blade colliding with air according to the rotation of the air flow accelerating device is inclined to form an acute angle with the surface of the disk.

21. The hard disk drive as claimed in claim 15, wherein:
the spindle motor further comprises a disk accommodating portion;
the disk drive further comprises a disk clamp which secures the disk to the disk accommodating portion; and
the air mover is formed integral with the disk accommodating portion of the spindle motor.

22. The hard disk drive as claimed in claim 21, wherein:
the accommodating portion of the spindle motor rotates within a predetermined circumference; and
the air mover further comprises at least one blade having a blade tip which extends beyond the predetermined circumference.

23. The hard disk drive as claimed in claim 15, wherein:
the hard disk drive further comprises:
a plurality of the disks;
at least one spacer, each spacer separating a pair of the disks; and
a plurality of the air movers provided on each spacer, one air mover being provided adjacent to each disk and within the third area of each disk.

24. The hard disk drive as claimed in claim 23, wherein:
the at least one spacer rotates with the disk within a predetermined circumference; and
the air mover further comprises at least one blade having a blade tip which extends beyond the predetermined circumference.

25. The hard disk drive as claimed in claim 15, wherein:
the spindle motor further comprises a disk accommodating portion;
the disk drive further comprises a disk clamp which secures the disk to the disk accommodating portion; and
the air mover is formed integral with the disk clamp.

26. The hard disk drive as claimed in claim 25, wherein:
the disk clamp rotates with the disk within a predetermined circumference; and the air mover further comprises at least one blade having a blade tip which extends beyond the predetermined circumference.

27. A hard disk drive, comprising:

a disk which stores data and having a surface with first, second and third areas;

a spindle motor which rotates the disk;

a slider having a magnetic head recording and/or reproducing data on the first area of the disk;

a pivotable actuator which moves the slider through the first area to record and/or reproduce the data and which moves the slider to a resting position in the second area; and an air mover which is positioned within the third area and which rotates with the disk to direct air between the slider and the disk, to lift the slider from the surface of the disk during rotation of the disk, wherein the air mover is formed integral with the disk.

28. A hard disk drive comprising:

a disk which stores data;

a pivotable actuator comprising a slider having a magnetic head for recording/reproducing data to/from the disk; and an air flow accelerator which rotates with the disk, the air flow accelerator comprising a blade having a front surface inclined at an acute angle with a surface of the disk, to collide with air and accelerate a speed of air flowing between the slider and the surface of the disk during the rotation of the disk.

29. A hard disk drive comprising:

a disk which stores data;

a pivotable actuator comprising a slider having a magnetic head for recording/reproducing data to/from the disk; and an air flow accelerator which rotates with the disk to accelerate a flow of air between the slider and the disk during rotation of the disk, the air flow accelerator comprising a blade which extends in a radial direction from a rotation axis of the disk wherein the blade is curved in a direction opposite to a direction in which the disk rotates.

30. A hard disk drive comprising:

a disk which stores data;

a pivotable actuator comprising a slider having a magnetic head for recording/reproducing data to/from the disk; and an air flow accelerator which rotates with the disk to accelerate a flow of air between the slider and the disk during rotation of the disk, the air flow accelerator comprising a blade having a thickness not greater than a thickness of the slider.

31. A hard disk drive comprising:

a disk which stores data;

a pivotable actuator comprising a slider having a magnetic head for recording/reproducing data to/from the disk; and an air flow accelerator formed integrally with a surface of the disk, to rotate with the disk and accelerate a flow of air between the slider and the disk.

* * * * *